(12) United States Patent
Tanaka et al.

(10) Patent No.: US 6,320,695 B1
(45) Date of Patent: Nov. 20, 2001

(54) OPTICAL AMPLIFYING APPARATUS (75) Inventors: Kanji Tanaka; Katsuhiko Iwashita; Shoichi Ozawa, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/482,068

(22) Filed: Jan. 13, 2000

(30) Foreign Application Priority Data

Jan. 14, 1999 (JP) .................................. 11-007516

(51) Int. Cl.$^7$ ............................................... H01S 3/00
(52) U.S. Cl. ............................................. 359/341.33
(58) Field of Search .............................. 359/341, 345, 359/341.33

(56) References Cited

U.S. PATENT DOCUMENTS 5,920,423 * 7/1999 Grubb et al. ..................... 359/341

* cited by examiner

*Primary Examiner*—Mark Hellner
(74) *Attorney, Agent, or Firm*—Lacasse & Associates; Randy W. Lacasse (57) ABSTRACT

A plurality of pumping light sources (1) which generate pumping light having wavelengths different from each other are connected to respective input ports of an optical multiplexer via optical reflectors (3). The respective pumping light is stabilized by optical reflectors with respect to the oscillating wavelengths, and is multiplexed by an optical multiplexer (4). The multiplexed pumping light is multiplexed to signal light passing through an optical fiber (6) for amplification. In the respective optical reflectors (3) and optical multiplexer (4), the optical lines are formed of materials whose differential coefficients of changes in the center wavelengths with respect to changes in temperature in the usage wavelength band are almost the same, and the set wavelengths of the respective input ports of the optical multiplexer (4) are made almost coincident with the center wavelengths of the input side optical reflectors (3), wherein the respective optical reflectors (3) and optical multiplexer (4) are disposed in almost the same environmental temperature atmosphere. Therefore, it is possible to always make coincident the center wavelength of the optical reflectors and that of the input ports of an optical ports of an optical multiplexer corresponding thereto regardless of changes in temperature without compensating for the temperature.

9 Claims, 5 Drawing Sheets

OPTICAL AMPLIFYING APPARATUS

FIELD OF THE INVENTION

The present invention relates to an optical amplifier apparatus for optical transmissions, and in particular, an optical amplifier apparatus used for wavelength division multiplexed transmission systems and an optical sea bottom transmission system whose transmission distance is long.

BACKGROUND OF THE INVENTION

As an optical amplifier apparatus used for an optical sea bottom transmission system, etc., whose transmission distance is long, it has been proposed that a remote pumping type optical amplifier apparatus is used. The remote pumping type optical amplifier apparatus has an advantage in that a pumping light source may be installed on land without being submerged on a sea bottom. However, since, in the remote pumping type optical amplifier apparatus, power of pumping light is attenuated by a transmission loss of optical fibers between a pumping light source and an erbium-doped optical fiber, it is necessary to increase output of the pumping light source. As one of the means for increasing the output of the pumping light source, such a method has been proposed, in which a plurality of pumping light having wavelengths different from each other are multiplexed as regards the wavelengths.

On one hand, in a wavelength division multiplexed transmission system, an attempt has been made, in which a degree of multiplexing is increased to increase the amount of transmission. Although it is considered, as one of the means for increasing the degree of multiplexing, that a wavelength band of optical fibers is widened, general erbium-doped optical fibers have only a gain band of 30 nm at maximum, and even though the band is widened to a longer wavelength band by lengthening the length of optical fibers, the erbium-doped optical fibers have only a gain of 60 nm at maximum. Therefore, based on the above description, Raman amplification, by which the gain band can be infinitely expanded, is now greatly expected. But, in order to infinitely widen the band in the Raman amplification, it is necessary to prepare a plurality of pumping lights of wavelength different from each other in order to infinitely widen the band in the Raman amplification, and wavelength multiplexing of pumping lights is requisite.

In various optical amplifiers as described above, it is necessary to multiplex pumping light sources having a plurality of wavelengths at a low loss. In cases where the number of pumping wavelengths is small as in prior arts, for example, although a dielectric multi-layered film filter is used as a multiplexing means in a case where the number of wavelengths is three or so, there was a shortcoming where the multiplexing loss is increased in line with an increase in the number of wavelengths in which the number of wavelengths becomes four or more.

Therefore, recently, it is proposed that a Mach-Zehnder type multiplexer is used as one of the methods for increasing the number of wavelengths with the multiplexing loss reduced. With a Mach-Zehnder type multiplexer, it is possible to increase the multiplexing loss on the basis of this principle even though the number of wavelengths is increased.

OBJECT AND SUMMARY OF THE INVENTION

However, in compliance with a narrowing of the interval between wavelengths as the number of pumping wavelengths to multiplex wavelengths is increased, dependency on the coupling efficiency of the Mach-Zehnder type multiplexer is increased, wherein it is necessary to align the center wavelength of the respective pumping light with the center wavelength of an optical multiplexer in order to efficiently multiplex wavelengths. Still further, the center wavelength of a fiber black grating and an optical multiplexer like a Mach-Zehnder type to stabilize the wavelengths of the pumping light sources is usually proportionate to a product of a refractive index and a specified device length (a specified optical path of a device). Therefore, the center wavelength is subjected to temperature dependency due to the temperature dependency of the refractive index and linear expansion, whereby the center wavelength moves approximately 0.01 nm per degree centigrade, and to align the center wavelengths, it was necessary to compensate the temperature and/or to regulate the temperature in each of the gratings and optical multiplexers. Accordingly, such shortcomings arise, wherein the number of components is increased, and the long-term reliability is reduced or production cost is raised.

In order to solve the above shortcomings and problems, it is therefore an object of the invention to provide an optical amplifier apparatus which is capable of efficiently multiplexing pumping light by aligning he center wavelengths without providing any temperature compensation and temperature regulation in a grating or an optical multiplexer, and in which the multiplexed pumping light intensity has less temperature dependency. Based thereon, it is possible to provide an optical amplifier apparatus for which the number of components is reduced and the long-term reliability is accordingly improved.

The invention is constructed as described below, in order to solve the above shortcomings and problems.

Figure 1:
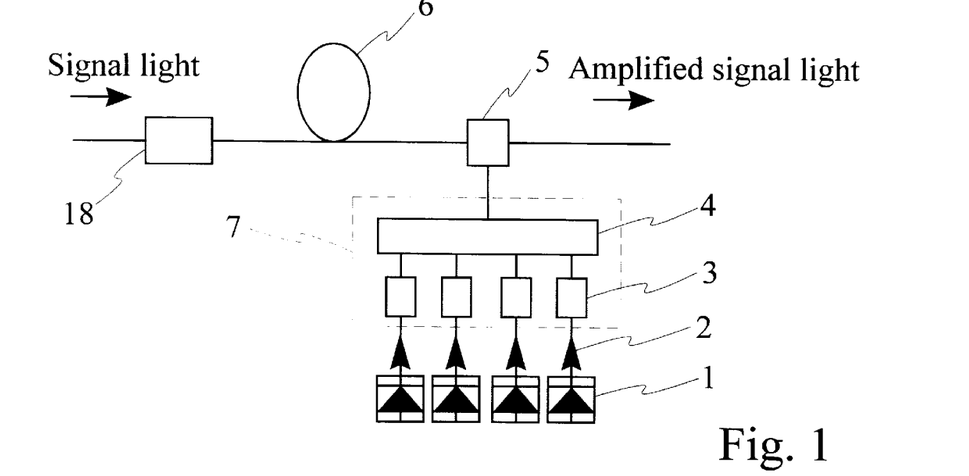
FIG. 1 is a block diagram showing general construction of an optical amplifier apparatus of the invention.

An optical amplifier apparatus according to a first construction of the invention is, as shown in FIG. 1, provided with a plurality of pumping light sources 1 having pumping wavelengths different from each other, an optical reflector 3 for stabilizing oscillation wavelengths of pumping light 2 generated from the pumping light sources 1, an optical multiplexer 4 for multiplexing the pumping light 2 of the pumping light sources 1, and an optical coupler 5 for multiplexing pumping light from the optical multiplexer so as to become signal light passing through an amplification optical fiber 6. Further, the optical amplifier apparatus is made into a device in which a plurality of optical reflectors and optical multiplexer are formed of materials whose differential coefficients of changes in the center wavelength with respect to changes in temperature in the usage wavelength band are almost equal to each other, set wavelengths of respective input ports in optical multiplexer are almost coincident with the center wavelengths of the optical reflectors at the input side, and the respective optical reflectors and optical multiplexer are disposed in almost the same environmental temperature atmosphere.

An optical amplifier apparatus according to a second construction of the present invention is characterized in that the optical reflector 3 and optical multiplexer 4 in FIG. 1 are made of $SiO_2$ glass or glass, mainly formed of $SiO_2$, to which at least one type of the constituents of $B_2O_3$, $P_2O_5$, GeO, $TiO_2$, and F is doped.

Figure 2:
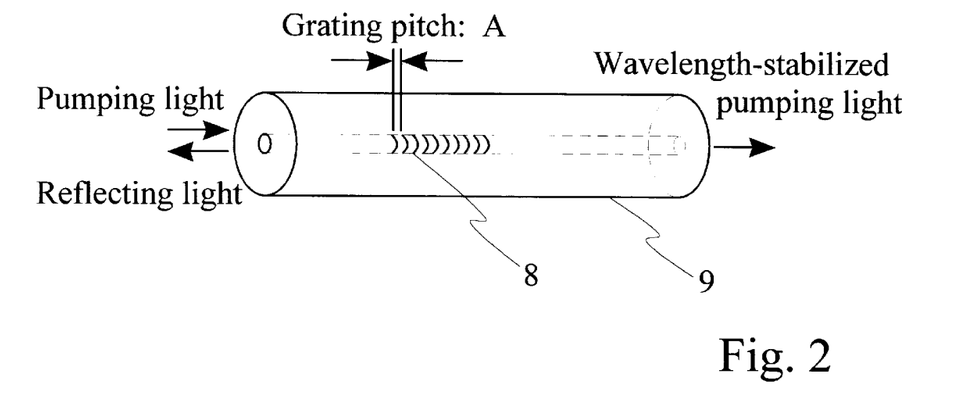
FIG. 2 is an explanatory view of a fiber black grating used for an optical amplifier apparatus of the invention.

An optical amplifier apparatus according to a third construction of the invention is characterized in that an optical fiber 9 is used, in which a black grating 8 having a grating pitch A as shown in FIG. 2 is formed as an optical reflector 3 stabilize an oscillation wavelength of pumping light 2 in FIG. 1.

Figure 3:
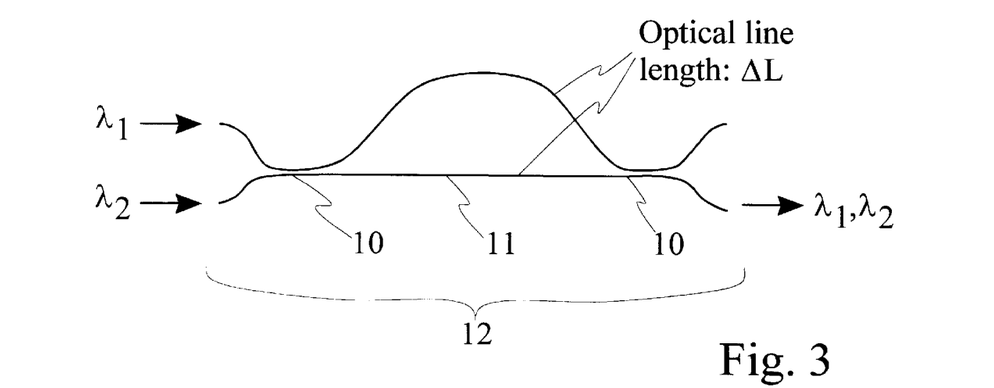
FIG. 3 is an explanatory view of a Mach-Zehnder type multiplexer used for an optical amplifier apparatus of the invention.

An optical amplifier apparatus according to a fourth construction of the invention is characterized in that one or more Mach-Zehnder type multiplexers 12 having a phase portion 11 of an optical line length difference ΔL between two directional coupler portions 10 as shown in FIG. 3 is used as an optical multiplexer device 4 to multiplex pumping light 2 in FIG. 1.

Figure 4:
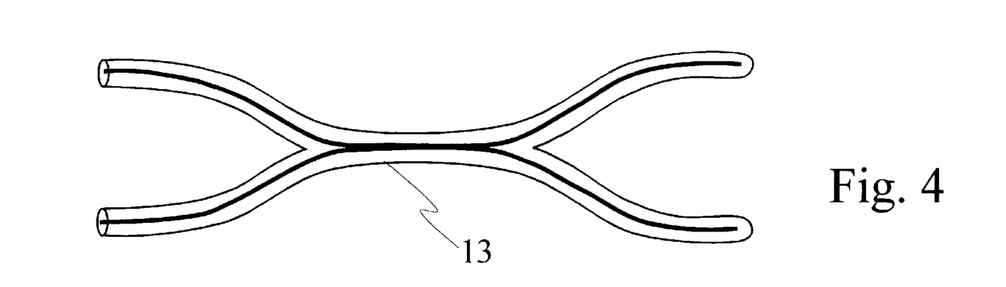
FIG. 4 is an explanatory view showing a fiber coupler used for an optical amplifier apparatus of the invention.

An optical amplifier apparatus according to a fifth construction of the invention is characterized in that a fusion fiber coupler 13, in which two optical fiber cores are made integral with each other by causing the cores to be placed in proximity or brought into close contact with each other as shown in FIG. 4, is used.

Figure 6:
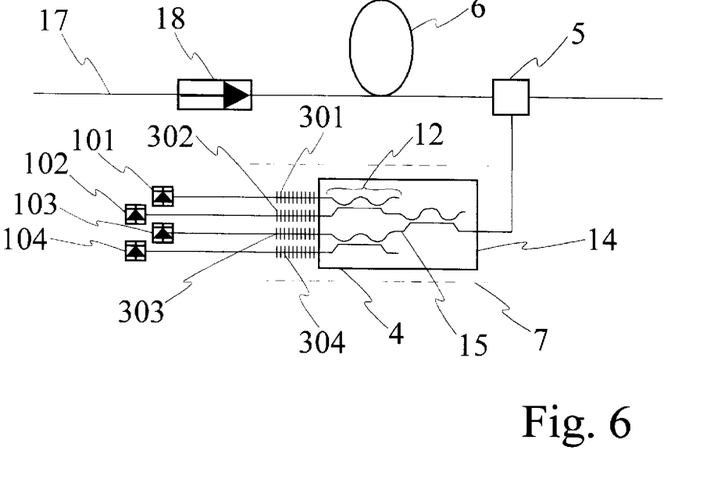
FIG. 6 is a block diagram showing an optical amplifier apparatus according to a first embodiment of the invention.

An optical amplifier apparatus according to a sixth construction of the invention is characterized in that a glass-made optical waveguide 15 formed on a substrate 14 as shown in FIG. 6 is used as a Mach-Zehnder type multiplexer.

Figure 11:
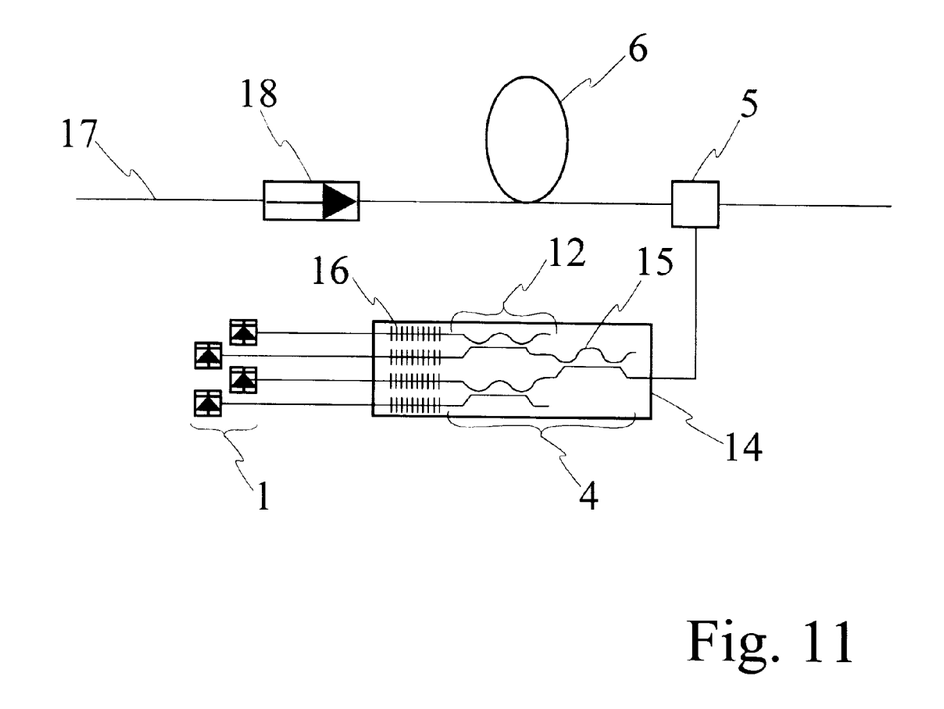
FIG. 11 is a block diagram showing an optical amplifier apparatus according to a second preferred embodiment of the invention.

An optical amplifier apparatus according to a seventh construction of the invention is characterized in that a glass-made optical waveguide 15 formed on a substrate 14 as shown in FIG. 11 is used as a Mach-Zehnder type multiplexer, and a black grating 16 is formed in an optical waveguide on the same substrate.

An optical amplifier apparatus according to a eight construction of the invention is characterized in that an erbium-doped optical fiber is used as an optical fiber 6 for amplification in FIG. 1 as shown in FIG. 1, and at least two or more wavelengths between 1450 nm and 1500 nm are selected as wavelengths of pumping light 2.

An optical amplifier apparatus according to a ninth construction of the invention is an optical fiber having an inductive Raman gain is used as an optical fiber 6 for amplification in FIG. 1, and a difference between the maximum frequency and the minimum frequency is made into 13 THz or less as a wavelength of pumping light.

Figure 5:
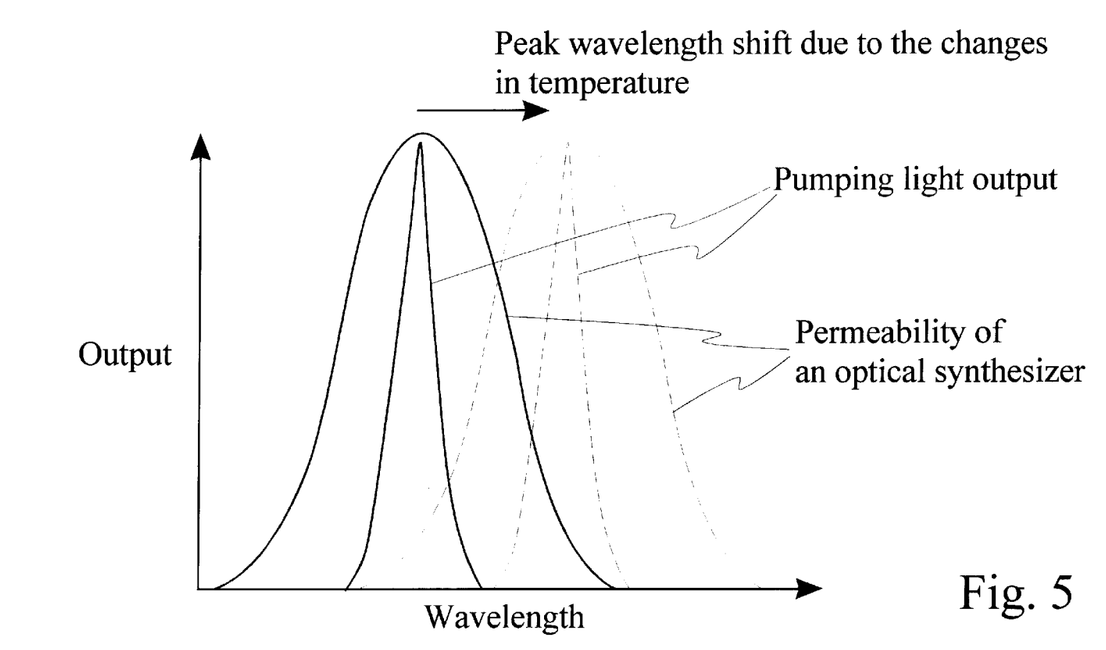
FIG. 5 is an explanatory view showing a shift of the center wavelengths depending on changes in temperature.

In an optical amplifier apparatus of the first construction of the invention, the optical reflector 3 and optical multiplexer 4 in FIG. 1 are formed of materials whose temperature dependency of an optical line length is almost the same, and are retained in the same environmental temperature. Accordingly, even though the environmental temperature changes as shown in FIG. 5, the center wavelength of the pumping light and the center wavelength of the optical multiplexer shift by the same amount by selecting the optical reflector 3 and optical multiplexer 4 whose center wavelengths are aligned with each other under the same environmental temperature, wherein the error therebetween is slight. therefore, pumping light can be efficiently multiplexed without compensating and adjusting the temperature.

In an optical amplifier apparatus according to the second construction of the invention, an optical multiplexer to multiplex pumping light from the optical reflector to stabilize the pumping light wavelength and the pumping light source is constructed as a device in which the center wavelengths thereof are proportionate to a product of a refractive index and a specified optical line length which determines the device characteristics. In such a device, the following expressions are established with respect to the center wavelength λ and temperature dependency (differential coefficients of changes in wavelength with respect to changes in the temperature t) dλ/dt of the center wavelength:

$$\lambda = k \cdot nL \quad (1)$$

$$d\lambda/dt = \lambda \cdot n \cdot dn/dt + \lambda/L \cdot dL/dt = \lambda/n \cdot dn/dt + da \quad (2)$$

where
k is a proportional constant,
n is a refractive index,
L is a specified optical line length which determines device characteristics, and
α is a linear expansion coefficient.

Therefore, the temperature dependency dλ/dt (differential coefficient) which is obtained by differentiating the center wavelengths of both the optical reflector and optical multiplexer by a temperature may be expressed by a similar expression regardless of a proportional constant k. Further, by forming both the optical reflector and optical multiplexer of pure $SiO_2$ glass or glass mainly made of $SiO_2$, the temperature slope dn/dt of the refractive index will become approximately $1 \times 10^{-5}$/° C., and the linear expansion coefficient will become 4 through $20 \times 10^{-7}$/° C., wherein the temperature dependency dλ/dt of the center wavelengths of both the optical reflector and optical multiplexer shows approximately the same figure. Therefore, the center wavelength of the pumping light and that of the optical multiplexer shift by the same amount even though the environmental temperature changes, wherein an error of the center wavelengths of both the pumping light and optical multiplexer is slight. Accordingly, if the center wavelengths are made coincident with each other under the same temperature environments, the center wavelengths of both are always coincident with each other without compensating and adjusting the temperature changes, whereby it becomes possible to efficiently multiplex pumping light.

In an optical amplifier apparatus according to the third construction of the invention, an optical fiber having a black grating formed is used as an optical reflector to stabilize the pumping wavelength. A specified optical line length which determines characteristics in the fiber black gratings indicates a grating pitch Λ shown in FIG. 2. The center wavelength λ of the fiber black grating is expressed by the following expression:

$$\lambda = 2 \cdot n\Lambda \quad (3)$$

where Λ is a grating pitch length.

Since expressions (1) and (3) are of the same form. Therefore, the temperature dependency of the center wavelength is expressed by expression (2). Accordingly, the center wavelength of the pumping light and that of the optical multiplexer shift by the same amount even though the environmental temperature changes, whereby an error between both is slight, and it becomes possible to efficiently multiplex the pumping light without compensating and adjusting the temperature.

An optical amplifier apparatus according to the fourth, fifth, sixth and seventh constructions of the invention employ a Mach-Zehnder type multiplexer as an optical multiplexer to multiplex the pumping light. A specified optical line length which determines characteristics in the Mach-Zehnder type multiplexer indicates a difference ΔL in an optical line length of two arms shown in FIG. 3. The center wavelength λ of the Mach-Zehnder type multiplexer is expressed by the following expression.

$$\lambda = n \cdot \Delta L / m \quad (4)$$

where m is an order of a Mach-Zehnder type interference meter (integral number or ½ times the integral number).

Since expressions (1) and (4) are of the same form, the temperature dependency of the center wavelength may be expressed by expression (2). Therefore, the center wavelength of the pumping light and that of the optical multiplexer shift by the same amount even though the environmental temperature changes, wherein an error between both is slight, and it becomes possible to efficiently multiplex the pumping light without compensating and adjusting the temperature.

An optical amplifier apparatus according to the eight construction of the invention employs an erbium-doped optical fiber as an optical fiber for amplification, whereby at least two wavelengths between 1450 nm and 1500 nm in a wavelength band, where erbium absorption is possible, are selected as wavelengths of the pumping light The pumping light intensity can be increased by using a plurality of pumping wavelengths.

An optical amplifier apparatus according to the ninth construction of the invention employs an optical fiber having an inductive Raman gain as an optical fiber for amplification, wherein a difference between the maximum frequency and the minimum frequency is made into 13 Thz or less as a wavelength of the pumping light. In glass mainly of $SiO_2$, the Raman gain can be obtained at the frequency side (longer wavelength side) lower by 13 Thz than the pumping wavelength. Therefore, if a wavelength band of a plurality of pumping lights is established so that the difference between the maximum frequency and the minimum frequency exceeds 13 THz, the pumping light and signal light are caused to overlap each other, thereby causing the waveform of the signal light to be deteriorated. Therefore, in the invention, the difference between the maximum frequency and the minimum frequency is established to be 13 THz or less as a wavelength of the pumping light. As described above, it is possible to increase the degree of multiplexing by using Raman amplification.

As described above, in an optical amplifier apparatus according to the invention, an optical reflector to stabilize the pumping wavelength and an optical multiplexer to stabilize the pumping light are made of materials which have almost the same temperature characteristics, and the center wavelengths of both the optical reflector to stabilize the pumping wavelength and optical multiplexer to multiplex the pumping light from the pumping light source are aligned with each other under the same environmental temperature, and both the optical reflector and optical multiplexer are used under almost the same environmental temperature. Therefore, the center wavelength of the optical reflector and that of the optical multiplexer becomes the same figure regardless of changes in the ambient environmental temperature, whereby it becomes possible to efficiently multiplex a plurality of pumping lights. An optical amplifier apparatus, in which the temperature dependency of the multiplexed pumping light intensity is reduced, can be proposed, and it becomes possible to excite an optical fiber for amplification, such as an erbium-doped optical fiber, an optical fiber having a Raman gain, by pumping light having high intensity and wide band, wherein such optical fibers are applicable in various optical transmission systems.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENT

FIG. 6 shows an optical amplifier apparatus according to the first preferred embodiment of the invention. An optical amplifier apparatus according to the embodiment is constructed so as to be provided with a signal input optical fiber 17, an optical isolator 18, an erbium-doped optical fiber 6 for amplification, which amplifies signal light, Fabry-Perot type semiconductor lasers 101, 102, 103, and 104 as pumping light sources, fiber black gratings 301, 302, 303, and 304 as optical reflectors to stabilize oscillation wavelengths of pumping light, an optical multiplexer 4 for multiplexing respective pumping light passed through the optical reflectors, and an optical coupler 5 for multiplexing (or branching) pumping light and signal light. As for the signal light, wavelengths from 1450 nm to 1560 nm, which are efficiently amplified by an erbium-doped optical fiber were selected as the wave bands thereof.

Figure 7:
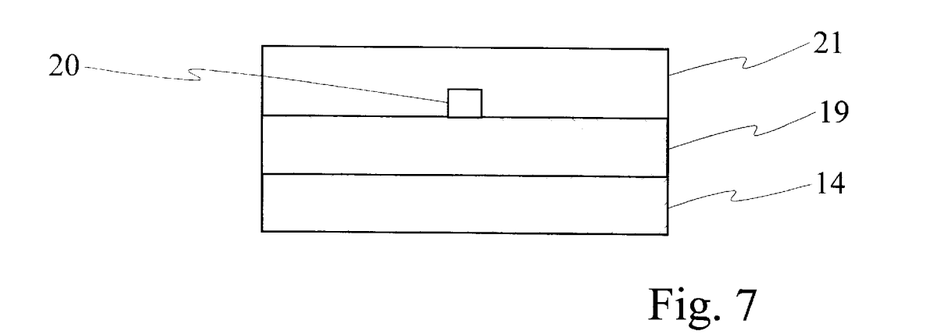
FIG. 7 is an explanatory view showing a cross-section of an optical waveguide in the first embodiment of the invention.

The Fabry-Perot type semiconductor lasers 101, 102, 103 and 104 are used as pumping light sources 1, and fiber black gratings 301, 302, 303 and 304 are used as an optical reflector 3 for stabilizing the wavelengths. Thus, by connecting the optical reflector 3 to the pumping light source 1, the optical reflector 3 acts as an external resonator which intensifies and stabilizes power of the pumping light generated at the pumping light source 1. Herein, the oscillating wavelength of the semiconductor lasers and the center wavelength (reflection center wavelength) of a fiber grating connected thereto are, respectively, the same. The semiconductor laser 101 and fiber grating 301 have a center wavelength at a wavelength of 1450 nm, the semiconductor laser 102 and fiber grating 302 have a center wavelength at a wavelength of 1480 nm, the semiconductor laser 103 and fiber grating 303 have a center wavelength at a wavelength of 1495 nm, and the semiconductor laser 104 and fiber grating 304 have a center wavelength at a wavelength of 1465 nm. Further, in the preferred embodiment, a single mode optical fiber is used as an optical fiber used to form gratings. Cladding of the single mode optical fiber is made of $SiO_2$ while the core is made of glass mainly made of $SiO_2$, on which $GeO_2$ is doped. Further, the black gratings are made by treating it with high pressure hydrogen and irradiating ultraviolet rays. Also, the optical multiplexer 4 is formed by using three Mach-Zehnder type optical multiplexers 12 constructed of an optical waveguide 15 on a substrate 14. The respective input ports of the Mach-Zehnder type multiplexer 12 have their center wavelengths at 1450 nm, 1480 nm, 1495 nm and 1465 nm. These center wavelengths are the same as the reflection center wavelengths of a fiber grating connected to the input side. Further, the optical waveguide has such a structure that, as shown in a cross-sectional view of FIG. 7, a cladding layer 19 and a core circuit 20 are formed on an Si substrate by using a flame depositing method (for example, refer to N. Takato et al., J. Lightware Tech., Vol. 6, pp. 1003 through 1010, 1988), and the core circuit 20 is covered by another cladding layer 21. The respective layers are made of glass mainly made of $SiO_2$, wherein $B_2O_3$ and $P_2O_5$ are doped to the cladding layer as a dopant, and $B_2O_3$, $P_2O_5$ and $TiO_2$ are doped to the core layer as a dopant.

As described above, the optical reflector 3 and optical multiplexer 4 are made of glass mainly formed of $SiO_2$. Both the optical reflector 3 and optical multiplexer 4 have almost the same temperature characteristics. Therefore, if both the optical reflector 3 and optical multiplexer 4 are placed in the same package 7, the center wavelengths of the optical reflector 3 and optical multiplexer 4, which are retained under the same environmental temperature, have a slight error even though the temperature changes.

Figure 8:
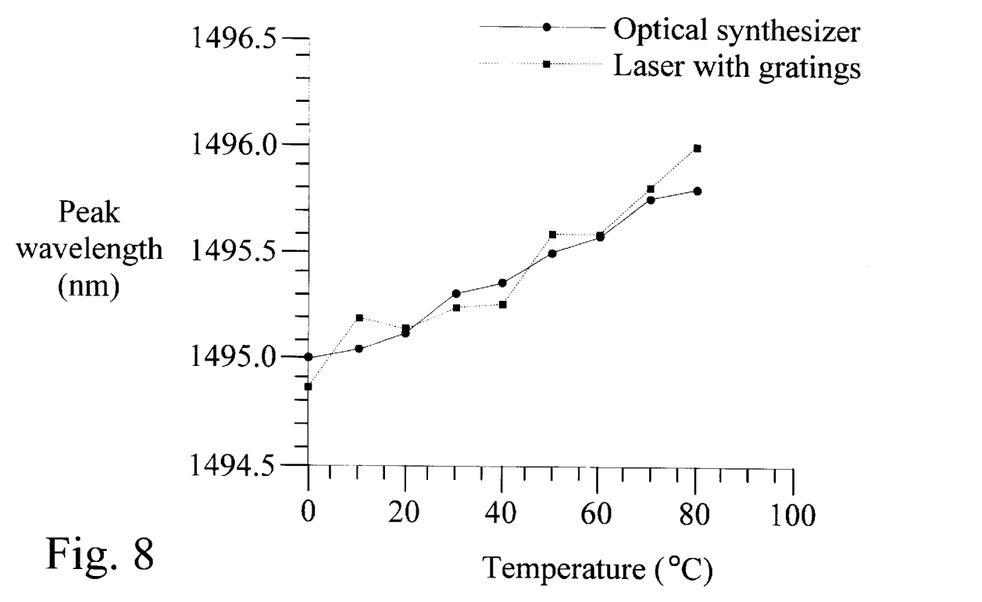
FIG. 8 is an explanatory view showing that the center wavelength of an optical multiplexer and a center wavelength of a semiconductor laser with a fiber grating, which are used in an optical amplifier apparatus of the first embodiment of the invention, have similar temperature conditions.

FIG. 8 shows temperature dependency of the center wavelength of an optical multiplexer and the oscillating wavelength of a semiconductor laser with fiber gratings. It is found in the drawing that the center wavelength of the optical multiplexer and the oscillating wavelength change at almost the same slope with respect to temperature. This indicates that, since both the optical multiplexer and fiber grating are made of glass mainly formed of $SiO_2$, both will have almost the same temperature characteristics.

Figure 9:
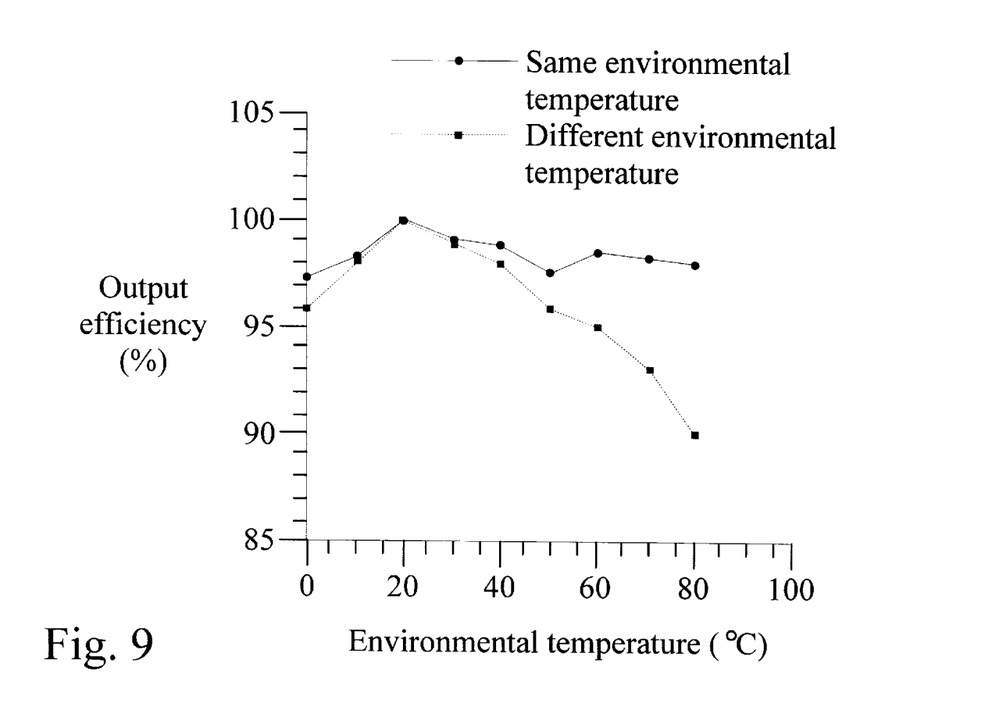
FIG. 9 is an explanatory view showing that, in an optical amplifier apparatus of the first embodiment of the invention, the temperature dependency of a multiplexed pumping output is reduced.

FIG. 9 shows temperature dependency of optical intensity outputted from the optical multiplexer. However, an optical multiplexer and fiber grating used in the drawing are selected so as to have the center wavelengths thereof to be aligned with each other at the environmental temperature of 20° C. it is found that the temperature change in the output intensity is further reduced in a case where the environmental temperature of both is changed than in a case where the environmental temperature in only the optical multiplexer is changed. As described above, it is found that pumping light can be efficiently multiplexed regardless of changes in the environmental temperature if the center wavelengths of both are aligned with each other at a certain temperature.

Figure 10:
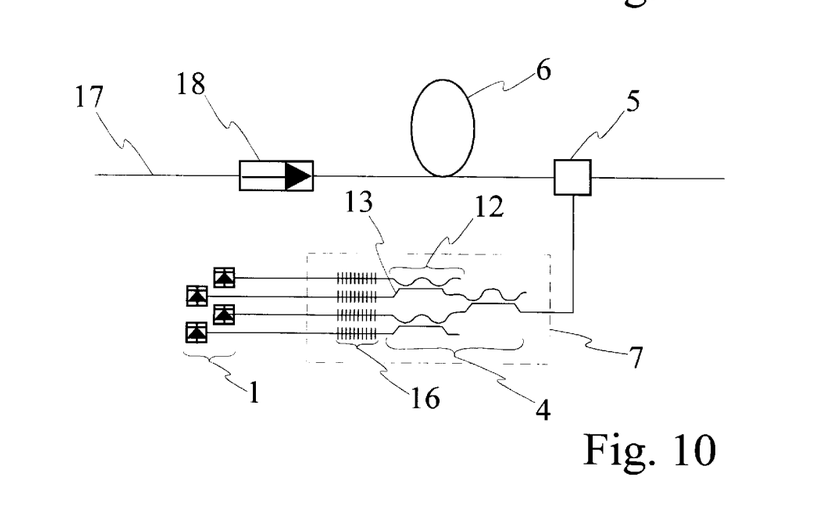
FIG. 10 is a block diagram showing an optical amplifier apparatus according to a second preferred embodiment of the invention.

FIG. 10 shows a second preferred embodiment of an optical amplifier apparatus according to the invention. In the preferred embodiment, a Mach-Zehnder type optical multiplexer 12, in which a fusion fiber coupler 13 is used as an optical multiplexer, is used. A single mode optical fiber is used as an optical fiber of the fusion fiber coupler, wherein the cladding is made of glass of only $SiO_2$, and the core is made of glass mainly formed of $SiO_2$, to which $GeO_2$ is doped. Other construction thereof is similar to that of an optical amplifier apparatus of the first preferred embodiment, which is shown in FIG. 6, wherein an overlapping description of common parts is omitted herein.

In the second preferred embodiment, single mode optical fibers having almost the same construction are used for fiber gratings 16 and optical multiplexer 4, and both the fiber gratings and optical multiplexer have completely the same temperature characteristics. Therefore, it is possible to efficiently multiplex pumping light regardless of changes in the environmental temperature if the center wavelengths of both the fiber gratings 16 and optical multiplexer 4 are aligned with each other at a certain temperature.

FIG. 11 shows a third preferred embodiment of an optical amplifier apparatus according to the invention. In the embodiment, an optical multiplexer 4 is formed of three Mach-Zehnder type optical multiplexers 12 constructed of an optical waveguide 15 on a substrate 14. Further, black gratings 16 are directly written on respective incident waveguides of the optical multiplexer. Other construction is the same as the optical amplifier apparatus of the first preferred embodiment shown in FIG. 6. Overlapping description of the common parts is omitted.

In the third preferred embodiment, the black gratings 16 and Mach-Zehnder type optical multiplexer 12 are formed by using the same optical waveguide, both the black gratings 16 and multiplexer have same temperature characteristics. Further, since these are formed on the same substrate, the black gratings and optical multiplexer are retained in the same environmental temperature without the use of any special package. Therefore, it is possible to efficiently multiplex pumping light regardless of the environmental temperature if the center wavelengths of both are aligned with each other at a certain temperature.

Next, a description is given of a fourth preferred embodiment of an optical amplifier apparatus according to the invention. Although the fourth embodiment is almost the same as the first preferred embodiment shown in FIG. 6, an optical fiber 6 for amplification is constructed of an optical fiber having a Raman gain while the other construction thereof is similar to that of the first preferred embodiment, wherein an overlapping description of the common parts is omitted.

In the fourth preferred embodiment, the oscillating wavelength of a semiconductor laser and the reflection center wavelength of fiber gratings connected thereto are the same, wherein it is designed so that the semiconductor laser 101 and fiber grating 301 have a center wavelength at a wavelength of 1420 nm, the semiconductor laser 102 and fiber grating 302 have a center wavelength at a wavelength of 1480 nm, the semiconductor laser 103 and fiber grating 303 have a center wavelength at a wavelength of 1510 nm, and the semiconductor laser 104 and fiber grating 304 have a center wavelength at a wavelength of 1450 nm. Since a difference between maximum frequency and the minimum frequency is 13 THz or less, the wavelength of signal light which can be amplified by a Raman effect becomes 1513 nm through 1615 nm, and the pumping light and signal light are not caused to overlap each other. With such a construction, it becomes possible to amplify at a wide wave band of 100 nm or more.

What is claimed is:

1. An optical amplifier apparatus comprising an optical fiber for amplification, which amplifies signal light, a plurality of pumping light sources for generating pumping light of oscillating wavelengths different from each other, a plurality of optical reflectors having reflection center wavelengths different from each other, which are connected to said pumping light sources so as to correspond to each of said pumping light sources one by one and stabilize oscillating wavelengths of said pumping light, an optical multiplexer for multiplexing pumping light of the pumping light sources, passed through the respective reflectors, and an optical coupler for multiplexing the pumping light from said optical multiplexer to signal light passing through said optical fiber for amplification, wherein said plurality of optical reflectors and said optical multiplexer are formed of materials whose differential coefficients of changes in the center wavelength with respect to changes in temperature in the usage wavelength band are almost equal to each other, set wavelengths of respective input ports in said optical multiplexer are almost coincident with the center wavelengths of the optical reflectors at the input side, and the respective optical reflectors and optical multiplexer are disposed in almost the same environmental temperature atmosphere.

2. An optical amplifier apparatus as set forth in claim 1, wherein both optical reflectors and optical multiplexers are made of pure $SiO_2$ glass or glass mainly formed of $SiO_2$, to which at least one type of the constituents among $B_2O_3$, $P_2O_5$, $GeO_5$, $TiO_2$ and F is doped.

3. An optical amplifier apparatus as set forth in claim 1, wherein the optical reflectors are constructed of optical fibers having black gratings formed.

4. An optical amplifier apparatus as set forth in claim 1, wherein the optical multiplexer is constructed so as to have one or more Mach-Zehnder type multiplexer which includes two direction couplers and a phase portion placed therebetween.

5. An optical amplifier apparatus as set forth in claim 4, wherein the Mach-Zehnder type multiplexer is constructed of a fusion fiber coupler.

6. An optical amplifier apparatus as set forth in claim 4, wherein the Mach-Zehnder type multiplexer is made of a glass-made optical waveguide formed on a substrate.

7. An optical amplifier apparatus as set forth in claim 4, wherein the Mach-Zehnder type multiplexer is made of a glass-made optical waveguide formed on a substrate, and black gratings are formed in said glass-made optical waveguide.

8. An optical amplifier apparatus as set forth in claim 1, wherein the optical fiber for amplification is constructed of an erbium-doped optical fiber, and oscillating wavelengths of the pumping light are at least two wavelengths between 1450 nm and 1500 nm.

9. An optical amplifier apparatus as set forth in claim 1, wherein the optical fiber for amplification is constructed of an optical fiber having an inductive Raman gain, and the oscillating wavelengths of the pumping light are established so that a difference between the maximum frequency and the minimum frequency is 13 THz or less.

* * * * *

UNITED STATES PATENT AND TRADEMARK OFFICE
CERTIFICATE OF CORRECTION

PATENT NO. : 6,320,695 B1
DATED : November 20, 2001
INVENTOR(S) : Tanaka et al.

It is certified that error appears in the above-identified patent and that said Letters Patent is hereby corrected as shown below:

<u>Drawings,</u>
Figure 2, the term "A" should read -- $\Lambda$ --

<u>Columns 1-8,</u>
The term "same amount" should read -- almost same amount --

<u>Columns 1-10,</u>
The term "black grating" should read -- Bragg grating --

<u>Column 2,</u>
Line 25, the word "he" should read -- the --;
Line 65, the phrase "pitch A" should read -- pitch $\Lambda$ --.

<u>Column 3,</u>
Line 47, the word "therefore" should read -- Therefore --;
Line 63, the formulae (2):
"$d\lambda / dt = \lambda n \cdot dn / dt + \lambda / L \cdot dL / dt = \lambda / n \cdot dn / dt + d\alpha$" should read
-- $d\lambda / dt = \lambda n \cdot dn / dt + \lambda / L \cdot dL / dt = \lambda / n \cdot dn / dt + \lambda \alpha$ --

<u>Column 4,</u>
Line 55, the term "interference meter" should read -- interferometer --.

<u>Column 5,</u>
Lines 11 and 14, the term "Thz" should read -- THz --;
Line 38, the term "the same" should read -- the almost same --.

<u>Column 6,</u>
Line 38, the term "1450 nm" should read -- 1530 nm --.

UNITED STATES PATENT AND TRADEMARK OFFICE
CERTIFICATE OF CORRECTION

PATENT NO. : 6,320,695 B1
DATED : November 20, 2001
INVENTOR(S) : Tanaka et al.

It is certified that error appears in the above-identified patent and that said Letters Patent is hereby corrected as shown below:

<u>Column 7,</u>
Line 23, the term "the same" should read -- the almost same --;
Line 39, the word "it" should read -- It --.

Signed and Sealed this

Twenty-third Day of July, 2002

Attest:

JAMES E. ROGAN
Attesting Officer
Director of the United States Patent and Trademark Office